United States Patent Office 3,454,802
Patented July 8, 1969

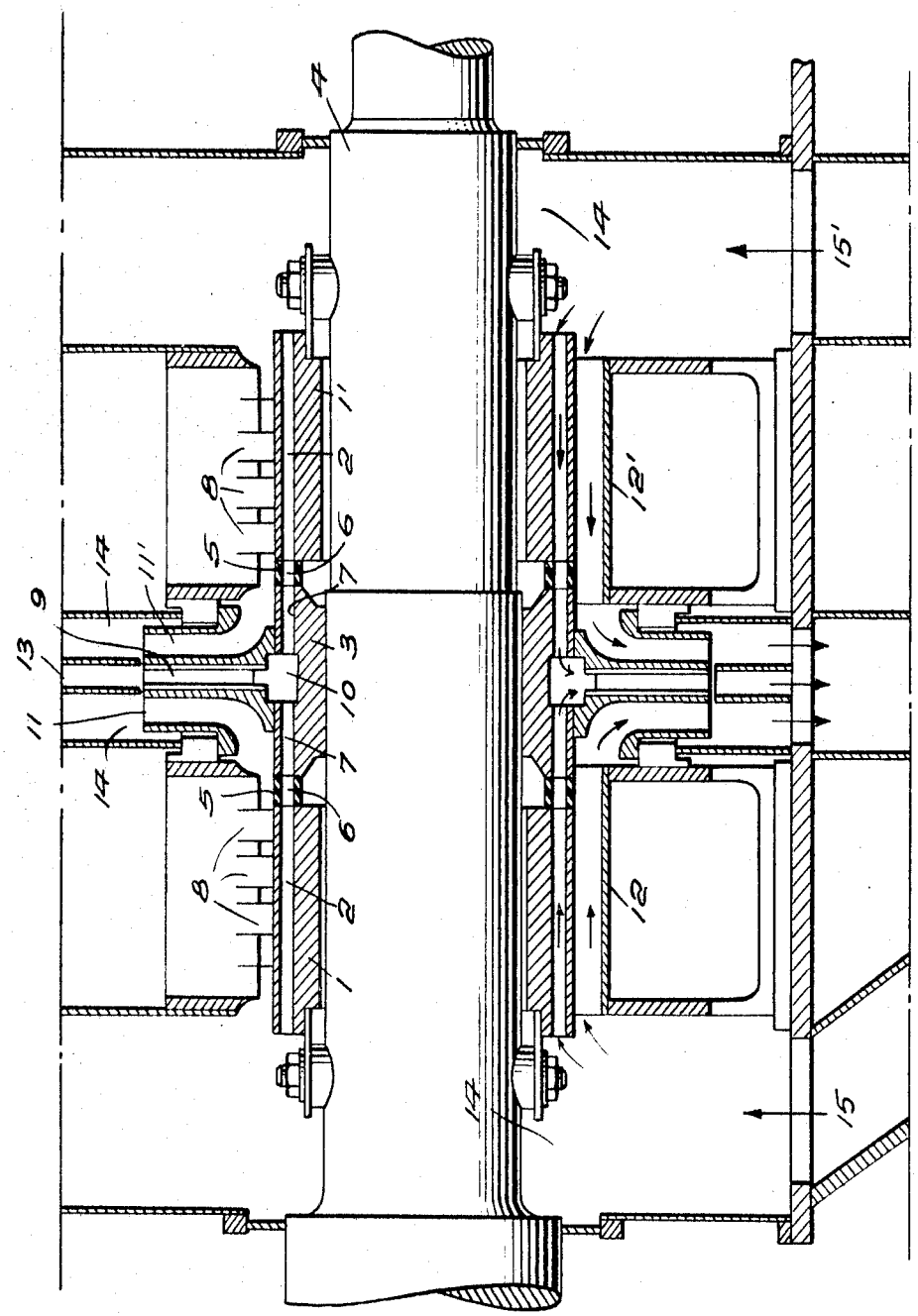

3,454,802
COLLECTOR RING COOLING ARRANGEMENT
Werner Haditsch, Birr, Switzerland, assignor to Aktiengesellschaft Brown, Boveri & Cie, Baden, Switzerland, a joint-stock company
Filed Aug. 17, 1967, Ser. No. 661,374
Claims priority, application Switzerland, Sept. 7, 1966, 12,951/66
Int. Cl. H02k 9/28
U.S. Cl. 310—227                             5 Claims

ABSTRACT OF THE DISCLOSURE

A collector ring structure for the rotor of an electrical machine such as a generator comprises a pair of cylindrical collector rings mounted on the rotor shaft in axially spaced relation. Each collector ring includes a circular array of axially extending circumferentially spaced through bores and a group of three exhaust fans of the radial type are located in side-by-side relation on the shaft between the collector rings. The axial intake of the middle one of the exhaust fans is connected with the axial bores in the collector rings so as to draw fresh cooling air through the bores and discharge the heated air in a radially outward direction into a scroll, and the axial intake of each of the two outer exhaust fans is arranged to draw fresh cooling air along the surface of a corresponding one of the collector rings and discharge the heated air in a radially outward direction into a scroll.

---

This invention relates to collector ring cooling and more particularly to an improved arrangement for removing the heat produced at the collector rings of large size electrical generators, and especially turbogenerators.

As is known, the transmission of current from brushes to collector rings on the generator rotor for the purpose of supplying the rotor winding with field current from an exciter machine involves losses in the form of friction and current with the result that such losses have to be removed by means of ventilating arrangements, the type of ventilation being determined by the amount of the losses involved.

It is generally known to provide for heat removal from the collector rings by natural cooling of the rings in which an air current is caused to flow along the surfaces of the rings, and also if need be, through bores or ducts provided within the body of the collector rings themselves. In order to intensify cooling, vaned cooling fans secured to the rotor and hence, rotatable therewith are provided to augment the natural cooling effect, by providing a more forceful movement of the cooling air currents in heat exchange relation with the surfaces of the rings.

In a known cooling arrangement employing the use of fans, the collector ring is provided in the middle with a radially extending cooling groove which is connected toward both sides with axial bores in the collector ring. Cooling discs are secured on both sides of the collector ring which, if necessary may be provided on both sides with fan blades. With this arrangement, cool, fresh air from the center of the collector ring is moved to both sides along the surface of the ring, as well as simultaneously over the radial cooling groove and through the axial bores in the collector ring by means of the cooling discs. However, in removing the collector ring heat in this manner, the cool air which exists on both sides of the collector ring from the axial bores must be turned by 90° and thereby braked, and is accelerated again afterwards when entering the exhaust fans. As a result of this braking and reacceleration of the cooling air, substantial impulse losses arise. Furthermore, the radial conveying of the cooling air in the center of the ring causes an undesirable structural division and weakening of the ring.

In view of the trend in the art to ever increasing sizes of electrical generators and especially turbogenerators, which lead to higher exciting currents that must be supplied to the generator rotor windings by means of the collector rings located on the rotor, the previously developed arrangements for removing heat from the rings no longer suffice.

The principal object of the present invention is therefore to provide an improved arrangement for cooling collector rings. The arrangement according to the invention makes use of the previously known techniques of providing axial bores in the ring and also conducting cooling air along the surface of the ring but which effects an essentially better and more intense cooling than was possible with the previously known constructions. In accordance with the invention, this objective is accomplished by providing at least three ventilating fans which have an axial intake and exhaust in a radially outward direction, these fans being mounted on the rotor shaft between two collector rings, the intermediate one of the three fans taking in cooling air through axial bores in both collector rings and each of the outer fans drawing air along the surface of the collector ring with which it is associated.

The foregoing as well as other objects and advantages inherent in the invention will become more apparent from the following description of one suitable embodiment thereof and from the accompanying drawing wherein the single view presented is a longitudinal central section through the collector ring assembly on the rotor shaft of a turbogenerator, the shaft being shown in elevation.

With reference now to the drawing, the rotor shaft 4 is seen to be provided with two collector rings 1, 1' mounted thereon in axially spaced relation. Each collector ring is provided with a plurality of axially extending through bores 2 located near the surface of the ring and distributed in uniformly spaced relation circumferentially of the ring. A metallic hub 3 secured to the shaft 4 is located intermediate the collector rings 1, 1' and is connected to each of the latter by means of rings 5 made from an electrically insulating material. These insulating rings serve to prevent the two collector rings 1, 1' from being short-circuited through the metal of hub 3, and are also provided with a plurality of axial through bores 6 which are aligned with the bores 2 in the collector rings and also aligned with axial through bores 7 in hub 3. Thus, the axial bores 2, 6 and 7 in the collector rings, insulating rings 5 and hub 3 respectively are the same in number and position so as to establish air flow passageways therethrough.

Three exhaust fans 9, 11 and 11' are shrunk onto hub 3 in a side-by-side manner between collector rings 1 and 1'. All three fans are of the radial type with axial intakes and radially outward exhaust. The axially located intake side of the intermediate fan 9 communicates with a manifold ring chamber 10 to which is connected all of the through bores 7 in hub 3. Thus, fan 9 functions to draw air through all of the axial bores 2 in both collector rings 1, 1'. Exhaust fan 11 is correlated to collector ring 1 and its axial intake is located adjacent the surface of this ring and serves to draw cooling air along the surface of this ring in a longitudinal manner, the air being guided between the ring surface and an arcuate guide plate 12 concentric with the ring surface and spaced therefrom at the side of the rotor shaft opposite the brushes 8 which bear on the ring. Similarly, exhaust fan 11' is correlated to collector ring 1' and serves to draw cooling air along the ring surface between the latter and an arcuate guide plate 12'. Heated air discharged from the middle exhaust fan 9 passes to a scroll 13, and heated air discharged from the outer exhaust fans 11, 11' passes to scrolls 14 and 14'.

All three of the exhaust fans 9, 11 and 11' draw fresh air from inlet ducts 15 and 15' located at the outer sides of the collector rings.

The cooling arrangement according to the invention thus operates in the following manner. Fresh air taken in by the intermediate exhaust fan 9 flows from inlets 15, 15' through the axially aligned bores 2, 6 and 7 to the manifold chamber 10 and thence to the axial intake of this fan, the air being discharged into scroll 13. Fresh air taken in by exhaust fans 11, 11' flows from inlets 15, 15' along the surfaces of collector rings 1, 1' and thence to the axial intakes of these fans, the air being discharged into scrolls 14, 14'.

The construction in accordance with the invention has the great advantage that cool air taken in by the middle exhaust fan 9 needs to be accelerated to the circumferential speed of the collector rings only when entering the axial bores 2, and that all further impulse losses are avoided. In this manner, the losses are reduced to a minimum not heretofore obtainable, and an extraordinary intensive cooling of the collector rings through the bores is accomplished. This manner of cooling, in conjunction with the separate conveyance of heat along the collector rings is so effective that collector rings which are required to transmit very large currents are always certain to have a completely satisfactory removal of the heat therefrom. With the described arrangement there results the additional advantage that different exhaust fans are correlated to different air passageways. By installing adjustable air flow restrictors in the scrolls of the fans, one is enabled to adjust the relative amounts of cooling air flow which pass respectively through the axial ducts interiorly of the collector rings and over the exterior surface of the rings, and thereby regulate the respective heat removal characteristics to the end that a uniform temperature of the rings may be achieved. Mounting of the exhaust fans is very simple and can take place after the collector rings have been mounted on the rotor shaft.

In conclusion, it is to be understood that while a preferred embodiment of the invention has been illustrated and described, the specific structure may be departed from in various manners without, however, departing from the spirit and scope of the inventive concept as defined in the appended claims.

As an example, while but a single, intermediate exhaust fan 9 is illustrated as handling air drawn through the axial bores of both collector rings 1, 1', by way of a common manifold chamber 10, two such fans can be utilized, the intake of one fan being correlated to the axial bores in collector ring 1, and the intake of the other fan being correlated to the axial bores in collector ring 1'.

I claim:

1. Collector ring structure for the rotor of an electrical machine such as a generator which comprises a pair of cylindrical collector rings mounted on the rotor shaft in axially spaced relation, each of said collector rings including a circular array of axially extending circumferentially spaced through bores, a group of at least three exhaust fans of the radial type located in side-by-side relation on said shaft between said collector rings, means establishing a communication between the axial intake of at least one intermediate exhaust fan of the group and the axial bores in said collector rings for drawing fresh air therethrough, and means for also drawing fresh air along the surface of each collector ring to the axial intake of a corresponding outer exhaust fan of the group.

2. Collector ring structure as defined in claim 1 wherein one intermediate exhaust fan of the group serves the axial through bores in both collector rings, the intake of said exhaust fan being in communication with a common manifold chamber which in turn is connected with the axial through bores in both collector rings.

3. Collector ring structure as defined in claim 1 and which further includes a hub mounted on said rotor shaft intermediate said collector rings, said group of exhaust fans being mounted on said hub, and said hub being provided with axial through bores corresponding in number and position to the axial bores in said collector rings and connected therewith and said hub being further provided with a manifold ring chamber connected to the axial bores in said hub and to the axial intake of said intermediate exhaust fan.

4. Collector ring structure as defined in claim 3 and which further includes rings of electrically insulating material located intermediate each side of said hub and the adjacent end of a corresponding one of said collector rings, said insulating rings also being provided with axial through bores corresponding in number and position to the axial bores in said collector rings and hub.

5. Collector ring structure as defined in claim 1 and which further includes an arcuate guide plate concentric with and spaced from the surface of each of said collector rings for guiding fresh cooling air along the surface of the rings into the respective axial intakes of the outer exhaust fans.

References Cited
UNITED STATES PATENTS

| | | | |
|---|---|---|---|
| 923,673 | 6/1909 | Lord | 310—227 |
| 1,316,790 | 9/1919 | Gruber | 310—63 |
| 1,476,940 | 12/1923 | Wilkinson | 310—61 |
| 2,436,322 | 2/1948 | Mueller | 310—58 |
| 2,970,234 | 1/1961 | Erickson | 310—61 |
| 3,089,969 | 5/1963 | Wiedemann | 310—58 |

MILTON O. HIRSHFIELD, *Primary Examiner.*

L. L. HEWITT, *Assistant Examiner.*